(12) United States Patent
Werth

(10) Patent No.: US 11,753,189 B2
(45) Date of Patent: Sep. 12, 2023

(54) HEATER APPARATUS AND METHOD FOR HEATING A COMPONENT OF A SPACECRAFT, AND SPACECRAFT COMPRISING A HEATER APPARATUS

(71) Applicant: ArianeGroup GmbH, Taufkirchen (DE)

(72) Inventor: Erich Werth, Bremen (DE)

(73) Assignee: ArianeGroup GmbH, Taufkirchen (DE)

( * ) Notice: Subject to any disclaimer, the term of this patent is extended or adjusted under 35 U.S.C. 154(b) by 749 days.

(21) Appl. No.: 15/989,318

(22) Filed: May 25, 2018

(65) Prior Publication Data

US 2018/0346157 A1    Dec. 6, 2018

(30) Foreign Application Priority Data

May 30, 2017    (DE) .......................... 102017111723.7

(51) Int. Cl.
  *B64G 1/50*    (2006.01)
  *B64G 1/40*    (2006.01)
  (Continued)

(52) U.S. Cl.
  CPC ............... *B64G 1/50* (2013.01); *B64G 1/401* (2013.01); *B64G 1/402* (2013.01); *B64G 1/503* (2013.01);
  (Continued)

(58) Field of Classification Search
  None
  See application file for complete search history.

(56) References Cited

U.S. PATENT DOCUMENTS 2,946,510 A * 7/1960 Galvin ...................... F24D 5/08
                                                                         237/70
3,046,734 A    7/1962 Abild
(Continued)

FOREIGN PATENT DOCUMENTS

DE     10306005 A1    9/2003
EP     2639162 A1    9/2013
(Continued)

OTHER PUBLICATIONS

European Search Report for corresponding European Patent Application No. 18174553.

(Continued)

*Primary Examiner* — Avinash A Savani
*Assistant Examiner* — Deepak A Deean
(74) *Attorney, Agent, or Firm* — Greer, Burns & Crain, Ltd.

(57) ABSTRACT

A heater apparatus configured to provide heat to at least one component of a spacecraft. The heater apparatus comprises a combustion chamber for a hypergolic propellant, and a heat radiator configured to radiate heat from the combustion chamber towards the at least one component to be heated. A spacecraft comprises at least one component to be heated and a heater apparatus configured to heat the at least one component to be heated. A method for heating at least one component of a spacecraft. The method comprises generating heat in a combustion chamber for a hypergolic propellant, and radiating at least a portion of the heat towards the at least one component.

11 Claims, 3 Drawing Sheets

(51) Int. Cl.
  *F02K 9/64* (2006.01)
  *F02K 9/58* (2006.01)
  *F23R 3/00* (2006.01)

(52) U.S. Cl.
  CPC .................. *F02K 9/58* (2013.01); *F02K 9/64* (2013.01); *F23R 3/005* (2013.01); *F05D 2240/35* (2013.01); *F05D 2260/22141* (2013.01)

(56) References Cited

U.S. PATENT DOCUMENTS

| | | | | |
|---|---|---|---|---|
| 4,073,138 | A * | 2/1978 | Beichel | F02K 9/48 60/245 |
| 4,583,362 | A | 4/1986 | Wagner | |
| 4,589,253 | A * | 5/1986 | Wagner | F02K 9/48 60/204 |
| 4,825,650 | A * | 5/1989 | Hosford | F01K 25/005 60/267 |
| 4,896,507 | A * | 1/1990 | Hosford | F03G 6/065 60/641.8 |
| 4,942,733 | A * | 7/1990 | Hosford | F01K 25/005 60/267 |
| 6,052,987 | A * | 4/2000 | Dressler | F02K 9/64 60/260 |
| 6,151,887 | A * | 11/2000 | Haidn | F02K 9/972 60/257 |
| 6,478,257 | B1 | 11/2002 | Oh et al. | |
| 6,968,673 | B1 * | 11/2005 | Knight | F02K 9/42 60/200.1 |
| 2004/0050838 | A1 | 3/2004 | Laurent et al. | |
| 2004/0206477 | A1 * | 10/2004 | Kenny | F04B 17/00 257/E23.098 |
| 2008/0022684 | A1 * | 1/2008 | Baldwin | F28D 7/0075 60/643 |
| 2013/0196273 | A1 * | 8/2013 | Mungas | B65D 83/72 431/11 |
| 2014/0319115 | A1 | 10/2014 | Altay | |
| 2015/0275823 | A1 * | 10/2015 | Herzberg | F02K 9/68 60/207 |
| 2016/0348612 | A1 * | 12/2016 | Bellomi | F02K 9/52 |
| 2018/0038316 | A1 * | 2/2018 | Balepin | F02K 9/972 |

FOREIGN PATENT DOCUMENTS

FR    2916485 A1    11/2008
WO    2013083436 A1    6/2013

OTHER PUBLICATIONS

European Examination Report for corresponding European Patent Application No. 18174553.

* cited by examiner

HEATER APPARATUS AND METHOD FOR HEATING A COMPONENT OF A SPACECRAFT, AND SPACECRAFT COMPRISING A HEATER APPARATUS

CROSS-REFERENCES TO RELATED APPLICATIONS

This application claims the benefit of the German patent application No. 10 2017 111 723.7 filed on May 30, 2017, the entire disclosures of which are incorporated herein by way of reference.

BACKGROUND OF THE INVENTION

The present invention concerns a heater apparatus for heating at least one component of a spacecraft, a spacecraft comprising a heater apparatus and a method for heating at least one component of a spacecraft.

Unmanned or manned spacecraft typically contain components such as electronic or mechanical elements which are to be heated, in certain environments, in order that they operate reliably. Conventionally, the heating of such components is provided electrically. However, electrical heating devices are usually heavy in relation to the heating capacity they provide. As a consequence, to transport the heater and to the drive the spacecraft carrying the heater, relatively high power is necessary.

SUMMARY OF THE INVENTION

It is, therefore, an object of the present invention to provide an improved technique for heating at least one component of a spacecraft.

A heater apparatus according to the present invention is configured to provide heat to at least one component of a spacecraft. The heater apparatus comprises a combustion chamber for a hypergolic propellant, and a heat radiator configured to radiate heat originating from the combustion chamber towards the at least one component to be heated. In particular, the heat radiator may thus be configured to be installed so as to radiate the heat towards the at least one component to be heated.

A spacecraft according to the present invention comprises at least one component to be heated and a heater apparatus according to an embodiment of the present invention, wherein the heat radiator is configured (in particular, installed) to radiate heat towards the at least one component to be heated.

A method according to the present invention is for heating a component of a spacecraft. The method comprises generating heat in a combustion chamber for a hypergolic propellant and radiating at least a portion of the thus generated heat towards the at least one component. Therein, the generating and the radiating of the heat may be accomplished by using a combustion chamber and a heat radiator, respectively, of a heater apparatus according to an embodiment of the present invention.

In terms of the heater apparatus, the spacecraft and the method, the present invention thus allows for heating the component with heat generated by combustion of a hypergolic propellant, wherein the heat is directed, by a heat radiator, towards the component to be heated. As compared to the conventional electrical heating of spacecraft components, the inventive technique making use of combustion heat generated by the hypergolic propellant can be implemented by involving material having a significantly reduced mass. Indeed, it has been shown that a mass of a heater apparatus according to the present invention plus a mass of elements needed for installation and operation thereof (such as a fuel supply line, an exhaust line and required fuel) may be less than a tenth of a mass required by a conventional electric heater providing a comparable heat output.

As a consequence, considerably less energy is required for transporting the heater apparatus, in particular, for flying the spacecraft comprising such heater apparatus to space.

The at least one component to be heated may be, for instance, at least one electromechanical device, at least one mechanical device, a fluid system device and/or at least one element of a system configured to provide a particular chemical reaction. According to a preferred embodiment, the at least one component to be heated comprises at least one avionics device. In particular, the heat radiator may be attached or configured to be attached to an avionics box containing at least one avionics device.

The spacecraft may be, for instance an artificial satellite, at least one module of a space station, a space probe, a spaceship or a landing vehicle (for landing, e.g., on an astronomical object, on an artificial satellite, on a space station or the like).

The hypergolic propellant may be a combination containing hydrazine, a derivate of hydrazine, nitric acid, dinitrogen tetroxide and/or hydrogen peroxide as components.

The combustion chamber may be connected or configured to be connected (by means of a fuel supply line) to a fuel tank containing at least one component of the hypergolic propellant. The tank may be further connected to an engine of the spacecraft.

According to a preferred embodiment, at least a portion of the heat radiator is (nearly) a black body. In particular, at least a portion of the heat radiator may preferably be coated with lamp-black or with vertically aligned carbon nanotube arrays (VANTAs). Thereby, a particularly good heat transfer to the component to be heated can be achieved. An emissivity c of at least a portion of a surface of the heat radiator preferably is in the range $0.6 \leq \varepsilon \leq 1$ or $0.75 \leq \varepsilon \leq 1$ or even $0.9 \leq \varepsilon \leq 1$.

The heat radiator may comprise a plurality of fins protruding at a surface of the heat radiator. Thereby, the heat transfer may be improved. For example, in preferable embodiments, the heat radiator may comprise at least ten fins or at least twelve fins, and/or at most twenty-five fins or at most twenty fins.

At least respective portions of the fins may extend along parallel straight lines and/or along parallel curves. Preferably, the fins protrude at a heat radiator's side facing or devised to face the component to be heated.

A total surface area A of the heat radiator may preferably be in the range 20 000 mm2 $\leq$ A $\leq$ 30 000 mm2 or even 24 000 mm2 $\leq$ A $\leq$ 27 000 mm2. A protrusion dimension d of the fins may be in the range 3 mm $\leq$ d $\leq$ 7 mm or in the range 4 mm $\leq$ d $\leq$ 6 mm The heat radiator may by at least partially be made of a metal such as aluminum. It may be composed of different parts, or it may be integrally formed (possibly including fins as mentioned above) as a monolith, e.g., by casting, by an additive manufacturing method or by shape cutting.

Preferably, the heat radiator has a mass G1 in the range 100 g $\leq$ G1 $\leq$ 200 g or 145 g $\leq$ G1 $\leq$ 175 g.

According to a preferred embodiment, the heater apparatus (comprising the heat radiator and excluding a supply line and an exhaust duct) has a mass G2 in the range 300 g $\leq$ G2 $\leq$ 600 g or 400 g $\leq$ G2 $\leq$ 500 g.

Preferably, a heater apparatus according to the present invention provides for a radiant flux (or rate of heat flow) L in the range 10 W≤L≤40 W or 20 W≤L≤30 W.

The heat radiator may be configured to receive heat directly from the combustion chamber. For instance, the combustion chamber may be arranged in a heat conducting block which may be attached to the heat radiator. The heat conducting block may be at a least partially made from metal, such as titanium and/or aluminum.

Preferably, in such embodiment, the heat conducting block and the heat radiator contact each other along a two-dimensional area of contact. Thereby, a particularly good heat transfer from the heat conducting block to the heat radiator is ensured. For instance, the heat conducting block and the heat radiator may both have a flat area of contact, or they may have, in an area of contact, respective surface profiles which engage with each other.

According to a preferred embodiment, the heater apparatus comprises a heat insulation block enclosing a portion of the combustion chamber; in embodiments where the combustion chamber is arranged in a heat conducting block, the heat insulation block may even enclose a portion of the heat conducting block. Preferably, the combustion chamber/the heat conducting block is arranged in a cavity formed in the heat insulation block. The cavity may at least partially be covered by the heat radiator. These embodiments reduce a heat loss and, thereby, increase the efficiency of the heater apparatus.

According to an advantageous embodiment of the present invention, the heater apparatus comprises an exhaust duct configured to discharge exhaust fumes from the combustion chamber, wherein at least a portion of the exhaust duct is configured to deliver heat absorbed from exhaust fumes to the heat radiator. Thereby, the efficiency of the heating can be improved, as both range and duration of the heat transfer may be increased by the portion of the exhaust duct.

For instance, the heat radiator may comprise a pipe system forming the at least one portion of the exhaust duct (such that the pipe system forms a part of the exhaust duct). Additionally or alternatively, at least one portion of the exhaust duct may run along a surface region of the heat radiator. Such surface region of the heat radiator may be flat, or the surface may comprise at least one groove within which the at least one portion of the exhaust duct may be counter-sunk. Therein, the at least one portion of the exhaust duct may preferably contact the surface and/or a heat conducting material such as a metal which may connect the at least one portion and the heat radiator.

According to a preferred embodiment, the exhaust duct forms at least one loop along the surface of the heat radiator and/or at least one loop within the heat radiator (in embodiments where the heat radiator comprises a pipe system as mentioned above).

In these embodiments, the exhaust may preferably comprise at least two branches. Thereby, the exhaust may be separated and ducted to different regions of the heat radiator. The at least two branches may be arranged essentially symmetric to each other. With respect to a devised flow direction of the exhaust, the branches may separate behind a common inlet and/or they may join before a common outlet of the exhaust duct. In particular, due to the separation, these embodiments allow for an improved uniformity of heat reception by the heat radiator.

A length of the exhaust duct (which comprise a sum of respective lengths of its branches, if present) may preferably be at least 100 mm, at least 150 mm or at least 180 mm. Additionally or alternatively, the length may be at most 300 mm or at most 250 mm or at most 220 mm.

In respective embodiments, a mean outer diameter of the exhaust duct may be at least 6 mm and/or at most 10 mm. The exhaust duct may have a mean wall thickness of at most 1.2 mm or at most 1 mm or even at most 0.8 mm. According to a preferred embodiment, the exhaust duct is at least partially made from titanium or a titanium alloy.

A heater apparatus according to the present invention may be installed or configured to be installed on an outer surface or at least partially within an interior of a spacecraft, e.g., within a shell of a satellite, of a space station, of a space probe, of a spaceship or of a landing vehicle.

Alternatively, the heater apparatus may be installed or configured to be installed at least partially on an outer surface of a spacecraft. In this case, the heater apparatus may be adapted to further operate as a thruster for the spacecraft, e.g., so as to control a position and/or orientation of the spacecraft. In these cases, the heater apparatus may thus provide a double functionality (namely, both thrust and heating a component), wherein waste heat produced when providing thrust can be utilized. In these embodiments, preferably a heating functionality of the heater apparatus is available even when a thrust functionality is suspended.

The heater apparatus may preferably comprise at least one adjustable valve and/or at least one adjustable pressure reducer, respectively connected with or to be connected with a fuel supply line. The at least one adjustable valve/at least one adjustable pressure reducer may be configured to control a supply of the hypergolic propellant (or of a component thereof) into the combustion chamber. Such adjustment may be carried out responsive to a respective heat demand and/or to a required functionality of the heater apparatus.

In particular, in embodiments where the heater apparatus is adapted to operate as a thruster as mentioned above, the at least one adjustable valve and/or pressure reducer preferably selectively provides a full fuel supply (which may be used when the heater apparatus operates as a thruster), at least one level of reduced fuel supply (which may be used when the heater apparatus operates as a heater only) and a blocked fuel supply. Thereby, an unnecessary waste of fuel can be prevented when the thruster functionality is suspended while the heating functionality is used, which prevention allows for carrying less fuel in the respective spacecraft.

In the following, preferred embodiments of the present invention are explained with respect to the accompanying drawings. As is to be understood, the various elements and components are depicted as examples only, may be facultative and/or combined on a manner different than depicted. Reference signs for related elements are used comprehensively and are not defined again for each figure.

BRIEF DESCRIPTION OF THE DRAWINGS

Shown is schematically in

FIG. 1b: a second sectional view of the heater apparatus shown in FIG. 1a;

FIG. 2b a plan view of the heat radiator shown in FIG. 2a; and

DETAILED DESCRIPTION OF THE PREFERRED EMBODIMENTS

Figure 1A:
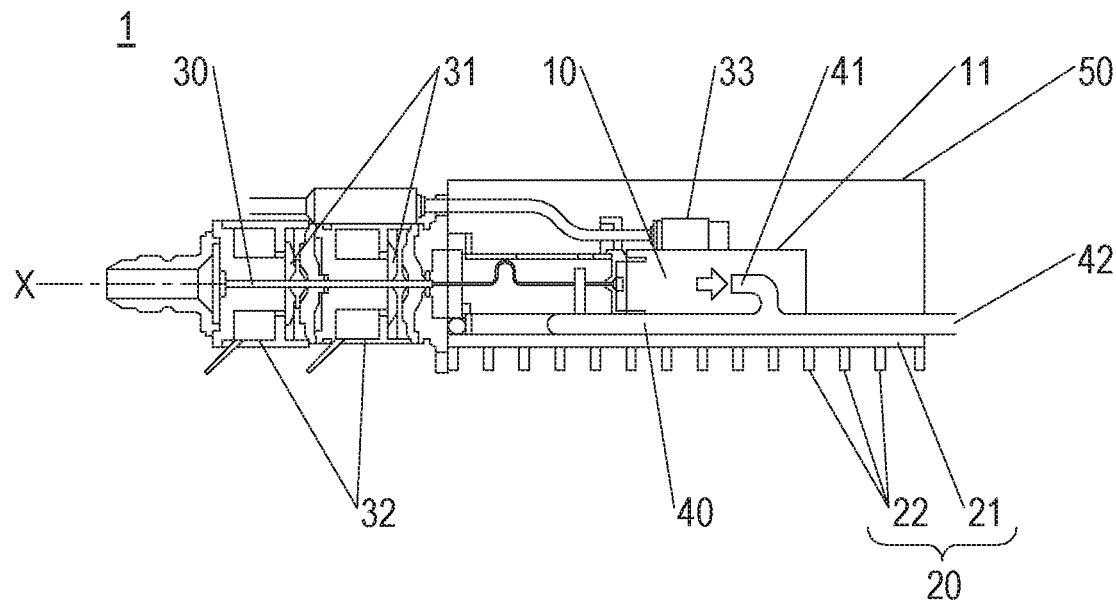
FIG. 1a, a first sectional view of an exemplary embodiment of a heater apparatus according to the present invention.

In FIG. 1a, an exemplary heater apparatus 1 according to an embodiment of the present invention is shown; the heater apparatus 1 is devised for heating at least one component of a spacecraft (not shown).

The heater apparatus 1 comprises a combustion chamber 10 for a hypergolic propellant combination (which may, for instance, contain hydrazine, a derivate of hydrazine, nitric acid, dinitrogen tetroxide and/or hydrogen peroxide), and a heat radiator 20 configured to radiate heat from the combustion chamber 10 towards the component to be heated.

A fuel pipe 30 is devised to form part of a fuel supply line connected with at least one fuel tank (not shown) containing a component of the hypergolic propellant (combination), to be fed into the combustion chamber 10. Valves 31, which in the example shown, are configured to be electromechanically operated by means of respective solenoids 32, are configured to control the component flow.

According to a preferred embodiment, at least one of the valves 31 is adjustable, such that it may be selectively closed, or opened at one of at least two possible opening levels. As a consequence, the valves and, therewith, the propellant component supply, may be tunable. In particular, in applications where the heater is further adapted to operate as a thruster as mentioned above, by means of the adjustable valves, feeding the propellant component may be adapted to whether the heater apparatus 1 is used, in a particular situation, as a heater only or whether it is additionally employed as a thruster.

The heat radiator 20 comprises a plate 21 with a flat surface facing the combustion chamber 10. At the opposite surface of the plate 21, the heat radiator 20 comprises a plurality of fins 22 protruding from the plate 21. In application of the heater apparatus, the fins 22 are preferably arranged so as to face the at least one component to be heated; a more detailed view of a heat radiator 20 is given in FIGS. 2a, 2b. Preferably, at least a portion of the heat radiator 20 is (nearly) a black body. In particular, at least a portion of the heat radiator may preferably be coated with lamp-black or with vertically aligned carbon nanotube arrays (VANTAs).

As further illustrated in FIG. 1a, a casing of the combustion chamber 10 is formed by a heat conducting block 11 which may be at least partially formed from aluminum or titanium. In the example shown, the heat conducting block 11 is essentially shaped as a cuboid. A flat surface of the heat conducting block 11 is entirely arranged on the flat surface of the plate 21 of heat radiator 20. A preheater element 33 is arranged on the heat conducting block 11; the preheater element 33 may provide for an advantageous ignition temperature in the combustion chamber 10.

Both the heat conducting block 11 (with the combustion chamber 10) and the preheater element 33 are arranged in a cavity, which is formed in a heat insulation block 50 and covered by the heat radiator 20. The heat insulation block 50 preferably contains insulation material.

An exhaust duct 40 comprising a duct inlet 41 and a duct outlet 42 is configured to discharge exhaust from the combustion chamber 10. Between the duct inlet and the duct outlet, the exhaust duct runs along the flat surface of the plate 21 of the heat conductor means. The exhaust duct 40 serves to transfer heat of conducted exhaust fumes to the heat conductor means 20.

Figure 1B:
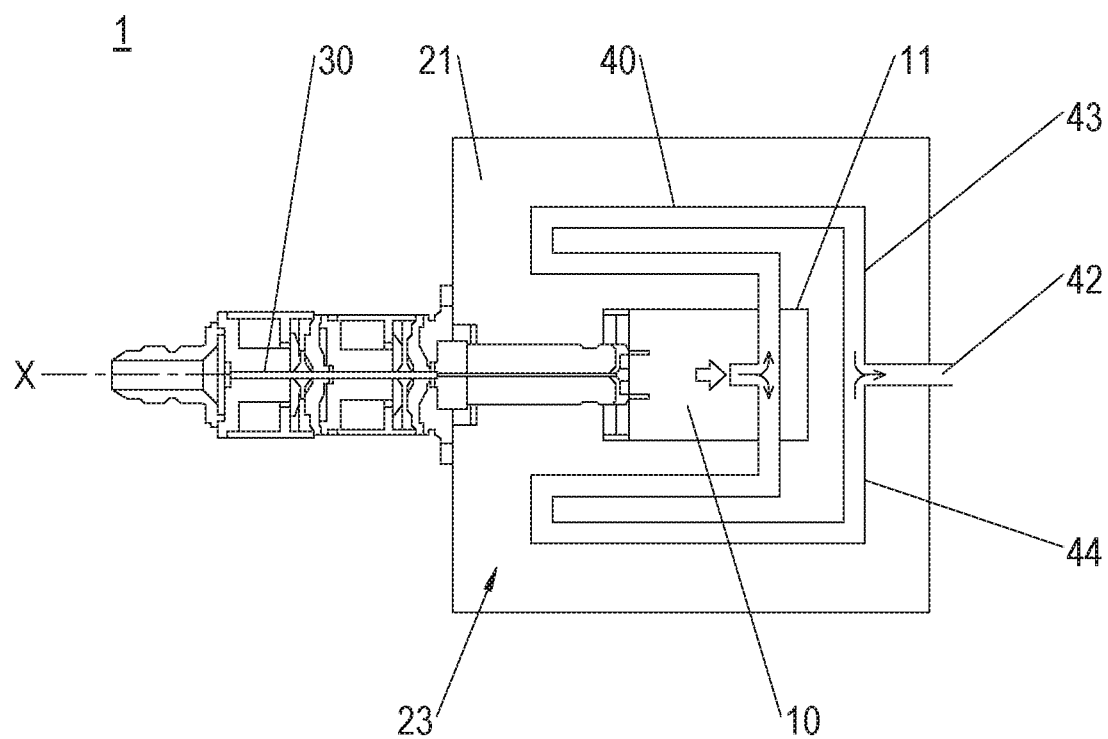

In FIG. 1b, the heater apparatus 1 depicted in FIG. 1a is shown in another sectional view; as compared to FIG. 1a, the heater apparatus is turned by 90° around the longitudinal axis X. Thereby, FIG. 1b, in particular, gives an insight into the heat insulation block 50, thus providing a view onto the flat surface 23 of plate 21 of the heat radiator 20 with the exhaust duct 40 arranged thereon.

As can be seen in FIG. 1b, the exemplary exhaust duct 40 depicted comprises two branches 43, 44. With regard to a dedicated exhaust flow direction (indicated in FIGS. 1a and 1b by respective arrows), the branches 43, 44 separate behind the inlet 41, they each form a loop along the flat surface 23 of the plate 21, and then they join before the outlet 42. A length of each branch (between the separation and the joining) may be at least 50 mm, at least 75 mm or at least 90 mm. Additionally or alternatively, the length may be at most 150 mm or at most 125 mm or at most 110 mm.

Figure 2A:
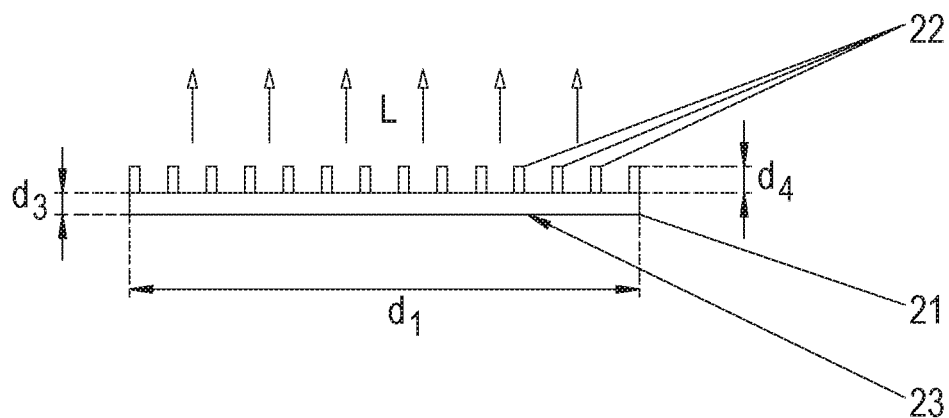
FIG. 2a a side view of an exemplary heat radiator of an embodiment of a heater apparatus according to the present invention.
Figure 2B:
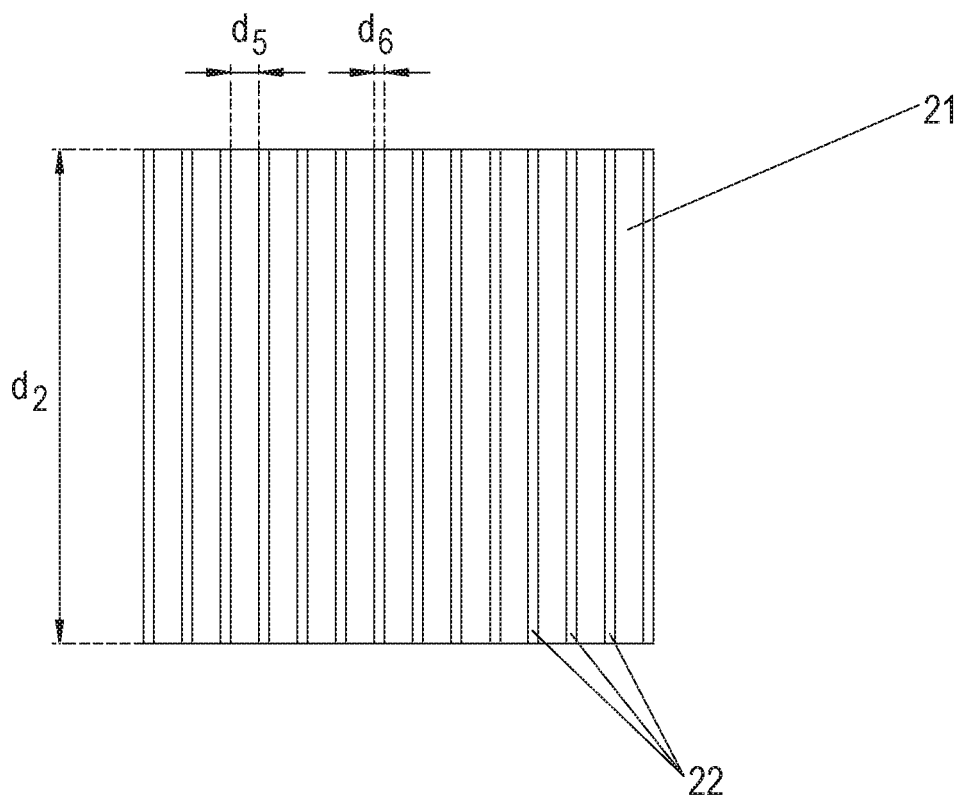

In FIGS. 2a, 2b, a heat radiator 20 is shown which comprises a plate 21 and a plurality of fins 22 protruding, by a protrusion dimension d4, at a side opposite to a flat surface 23 of the plate 21. According to preferred embodiments, 3 mm≤d4≤7 mm or 4 mm≤d4≤6 mm holds true.

As indicated by arrows, the heat radiator is configured to produce a radiant flux L in a protrusion direction of the fins 22.

As can be seen in FIG. 2b, the plate 21 is shaped as rectangle, and the fins 22 extend straight and parallel to one another, with a respective distance d5. According to alternative (not shown) embodiments, the plate may be shaped as a disk, and/or the fins may, for instance, extend along (preferably parallel) curves, or they may extend as concentric rings.

In the exemplary embodiment depicted in FIGS. 2a, 2b, the plate 21 has a first extension d1 and a second extension d2 (which is orthogonal to the first extension).

According to exemplary advantageous embodiments, 70 mm≤d1≤140 mm or 90 mm≤d1≤120 mm holds true, and/or 70 mm≤d2≤140 mm or 90 mm≤d2≤120 mm. In particular, d1 and d2 may be equal, or they may differ by at most 10 mm or at most 5 mm.

A thickness d3 of the plate 21 may preferably comply with 2 mm≤d3≤6 mm or even 3 mm≤d3≤5 mm.

In the exemplary embodiment shown in FIG. 2b, the fins 22 are arranged side by side along d1, while their lengths extend in the same direction as d2. In the example depicted, d2 coincides with the respective lengths of the fins 22.

A thickness d6 of the fins (measured in parallel to the surface 23 of the plate 21 and orthogonally to a lengths of the fins) may preferably comply with 1 mm≤d6≤3 mm or even 1.5 mm≤d6≤2.5 mm.

In preferable embodiments, the heat radiator 20 may comprise at least ten fins 22 or at least twelve fins 22, and/or at most twenty-five fins 22 or at most twenty fins 22. In the exemplary embodiment shown, the heat radiator 20 comprises fourteen fins 22.

Figure 3:
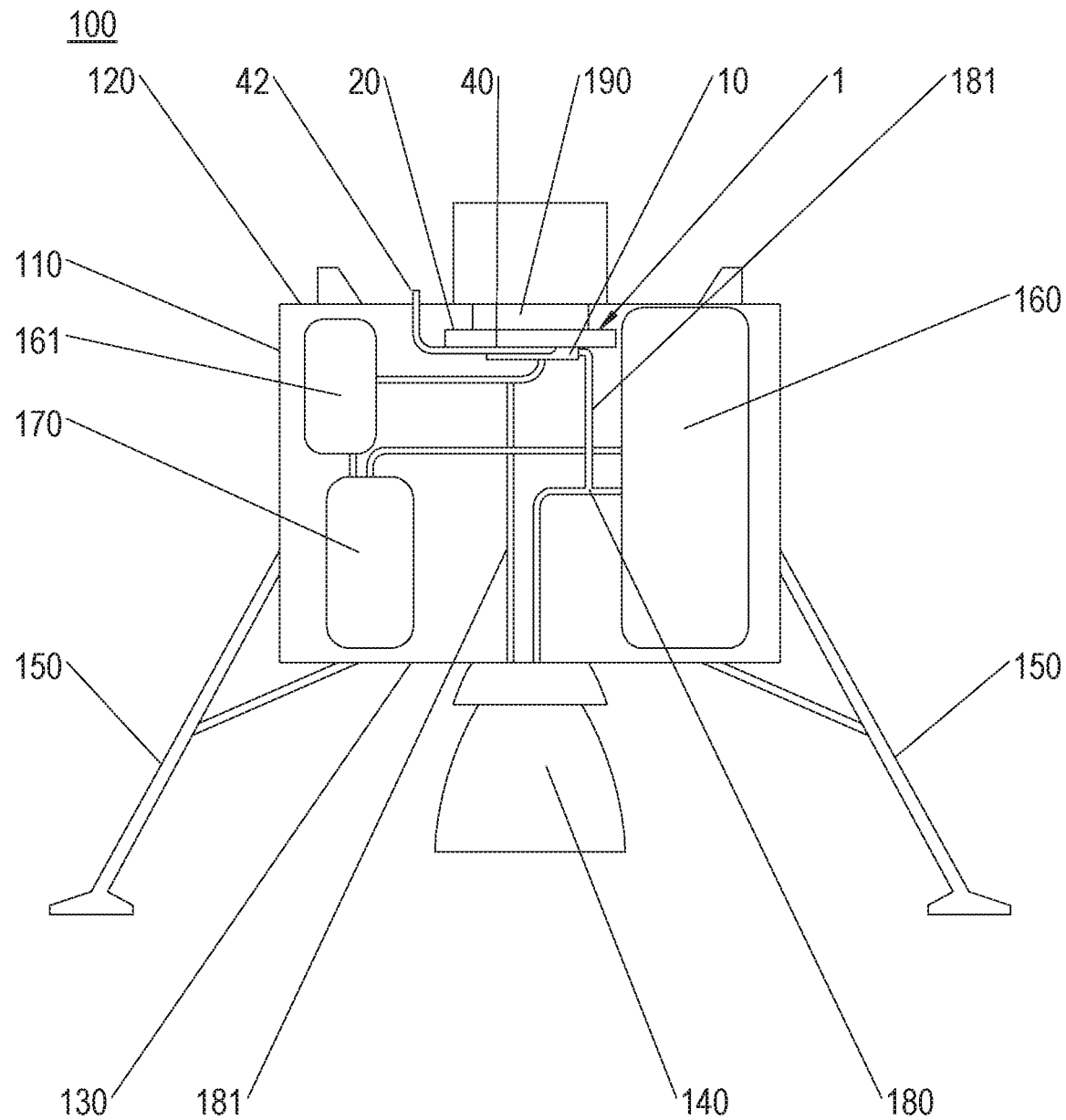
FIG. 3 a spacecraft according to an exemplary embodiment of the present invention.

FIG. 3 provides an insight into a schematically depicted exemplary spacecraft 100 (being a landing vehicle) according to an embodiment of the present invention. The spacecraft comprises a shell 110 with a payload platform 120, an engine platform 130 (with an engine 140 mounted thereto) and support legs 150.

A fuel tank 160 (preferably containing a hypergolic propellant component such as hydrazine or a derivative thereof) and an oxidizer tank 161 are each connected, by a respective supply line 180, 181, with an engine 140. Both tanks 160, 161 are connected to a pressure tank 170 which can be used to control the discharge of the fuel tank 160 and the oxidizer tank 161 into the respective supply lines 180, 181.

Moreover, the spacecraft 100 comprises at least one avionics device contained in an avionic box 190, which in the exemplary embodiment depicted is mounted to the payload platform.

A heater apparatus 1 according to an embodiment of the present invention is provided to heat the avionic box 190. The heater apparatus 1 comprises a combustion chamber 10 connected, via the fuel supply line 180 and the oxidizer supply line 181, with the fuel tank 160 and the oxidizer tank 161. Heat which may be generated in the combustion chamber 10 can be transmitted to a heat radiator 20 mounted to the avionic box 190. An exhaust duct 40 is configured to duct exhaust fumes caused by the combustion from an inlet (not shown) within the combustion chamber 10 along a surface of the heat radiator 20 to an outlet 42.

According to alternative embodiments of the present invention, at least one thruster (not shown) may be mounted, adjacent the avionic box 190, to the payload platform 120. The thruster may then be used both to provide thrust, e.g., to fine-tune a position and/or an orientation of the spacecraft, and to heat the avionic box 190.

Disclosed is a heater apparatus 1 configured to provide heat to at least one component of a spacecraft. The heater apparatus 1 comprises a combustion chamber 10 for a hypergolic propellant, and a heat radiator 20 configured to radiate heat from the combustion chamber 10 towards the at least one component to be heated.

Further disclosed is a spacecraft 100 comprising at least one component 190 to be heated and a heater apparatus 1 configured to heat the at least one component to be heated.

Further disclosed is a method for heating at least one component 190 of a spacecraft 100. The method comprises generating heat in a combustion chamber 10 for a hypergolic propellant, and radiating at least a portion of the heat towards the at least one component 190.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

REFERENCE SIGNS 1 heater apparatus
10 combustion chamber
11 heat conducting block
20 heat radiator
21 plate
22 fin
23 flat surface of the plate
30 fuel pipe
31 valve
32 solenoid
33 preheater element
40 exhaust duct
41 inlet of exhaust duct
42 outlet of exhaust duct
43, 44 branch of exhaust duct
50 insulation block
51 insulation material
100 spacecraft
110 shell
120 payload platform
130 engine platform
140 engine
150 support leg
160 fuel tank
161 oxidizer tank
170 pressure tank
180 fuel supply line
181 oxidizer supply line
190 avionic box
L radiant flux
X center axis of heater apparatus

The invention claimed is:

1. An assembly comprising:
an avionics box containing at least one avionics device for a spacecraft, and
a heater apparatus to provide heat to the at least one avionics device, wherein the heater apparatus comprises:
a combustion chamber for a hypergolic propellant, and
a heat radiator configured to radiate heat originating from the combustion chamber towards the at least one avionics device to be heated,
wherein the combustion chamber is arranged in a heat conducting block at least partially attached to a surface of the heat radiator,
and wherein the heat radiator is attached to the avionics box.

2. The assembly according to claim 1, wherein the heater apparatus further comprises an exhaust duct configured to discharge exhaust fumes from the combustion chamber, wherein at least a portion of the exhaust duct is configured to deliver heat absorbed from exhaust fumes to the heat radiator.

3. The assembly according to claim 2, wherein the exhaust duct forms at least one loop along a surface of the heat radiator.

4. The assembly according to claim 2, wherein the exhaust duct forms at least one loop within the heat radiator.

5. The assembly according to claim 2, wherein the exhaust duct comprises at least two branches.

6. The assembly according to claim 1, wherein the heater apparatus further comprises a heat insulation block enclosing a portion of the combustion chamber.

7. The assembly according to claim 1, wherein the heater apparatus is further configured to operate as a thruster.

8. The assembly according to claim 1, wherein the heater apparatus further comprises at least one adjustable valve configured to control a supply of the hypergolic propellant into the combustion chamber.

9. The assembly according to claim 1, wherein the heater apparatus further comprises at least one pressure reducer configured to control a supply of the hypergolic propellant into the combustion chamber.

10. A spacecraft comprising the assembly according to claim 1.

11. A method for heating at least one avionics device of a spacecraft, the method comprising:
- generating heat by combustion of a hypergolic propellant in a combustion chamber for a hypergolic propellant, and
- radiating at least a portion of the heat towards the at least one avionics device,
- wherein the combustion chamber is arranged in a heat conducting block at least partially attached to a surface of a heat radiator,
- said heat radiator being attached to an avionics box containing the at least one avionics device.

* * * * *